(12) United States Patent
Kamon et al.

(10) Patent No.: US 10,778,106 B2
(45) Date of Patent: Sep. 15, 2020

(54) POWER CONVERSION SYSTEM

(71) Applicant: PANASONIC INTELLECTUAL PROPERTY MANAGEMENT CO., LTD., Osaka (JP)

(72) Inventors: Yutaka Kamon, Kyoto (JP); Fumito Kusama, Osaka (JP); Takaaki Norisada, Osaka (JP); Makoto Ozone, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/607,691

(22) PCT Filed: Apr. 23, 2018

(86) PCT No.: PCT/JP2018/016498
§ 371 (c)(1),
(2) Date: Oct. 23, 2019

(87) PCT Pub. No.: WO2018/199042
PCT Pub. Date: Nov. 1, 2018

(65) Prior Publication Data
US 2020/0052601 A1 Feb. 13, 2020

(30) Foreign Application Priority Data

Apr. 24, 2017 (JP) ................................ 2017-085307
Jan. 31, 2018 (JP) ................................ 2018-015695

(51) Int. Cl.
*H02M 1/32* (2007.01)
*H02M 3/335* (2006.01)
(Continued)

(52) U.S. Cl.
CPC ......... *H02M 3/33584* (2013.01); *H02M 1/32* (2013.01); *H02M 7/515* (2013.01); *H02M 1/36* (2013.01)

(58) Field of Classification Search
CPC ............ H02M 1/32; H02M 1/34; H02M 1/36; H02M 3/33569; H02M 3/33584;
(Continued)

(56) References Cited

U.S. PATENT DOCUMENTS 8,305,783 B2 * 11/2012 Rizzo ..................... H02H 9/002
363/53
8,339,055 B2 * 12/2012 Zhan ..................... H05B 45/37
315/219
(Continued)

FOREIGN PATENT DOCUMENTS

JP     H07-023505 A     1/1995
JP     2015-061440 A     3/2015
(Continued)

OTHER PUBLICATIONS

International Search Report and Written Opinion issued in International Patent Application No. PCT/JP2018/016498, dated Jul. 3, 2018; with partial English translation.

*Primary Examiner* — Matthew V Nguyen
(74) *Attorney, Agent, or Firm* — McDermott Will & Emery LLP

(57) ABSTRACT

A power conversion system includes a first capacitor, an isolated type converter circuit, and a control circuit. The first capacitor is connected to the direct-current power supply via an inrush current prevention circuit. The inrush current prevention circuit is switchable at least between a high-impedance state and a low-impedance state. The converter circuit includes a transformer, and the first capacitor is connected to a primary winding wire of the transformer. The control circuit controls the inrush current prevention circuit
(Continued)

and the converter circuit to cause the converter circuit to start operating, and then, the control circuit switches the inrush current prevention circuit from the high-impedance state to the low-impedance state.

9 Claims, 7 Drawing Sheets

(51) Int. Cl.
*H02M 7/515* (2007.01)
*H02M 1/36* (2007.01)

(58) Field of Classification Search
CPC .... H02M 3/337; H02M 7/515; H02M 7/5387; H02M 2001/007; H02M 2001/348
See application file for complete search history.

(56) References Cited

U.S. PATENT DOCUMENTS

| | | | |
|---|---|---|---|
| 2007/0223260 A1* | 9/2007 | Wang | H02H 9/002 363/52 |
| 2012/0044721 A1* | 2/2012 | Liang | H02M 3/33569 363/21.02 |
| 2015/0280603 A1* | 10/2015 | Yuasa | H02M 1/36 363/37 |
| 2016/0233801 A1 | 8/2016 | Sakai | |

FOREIGN PATENT DOCUMENTS

| | | |
|---|---|---|
| JP | 2016-052222 A | 4/2016 |
| JP | 2016-226199 A | 12/2016 |

* cited by examiner

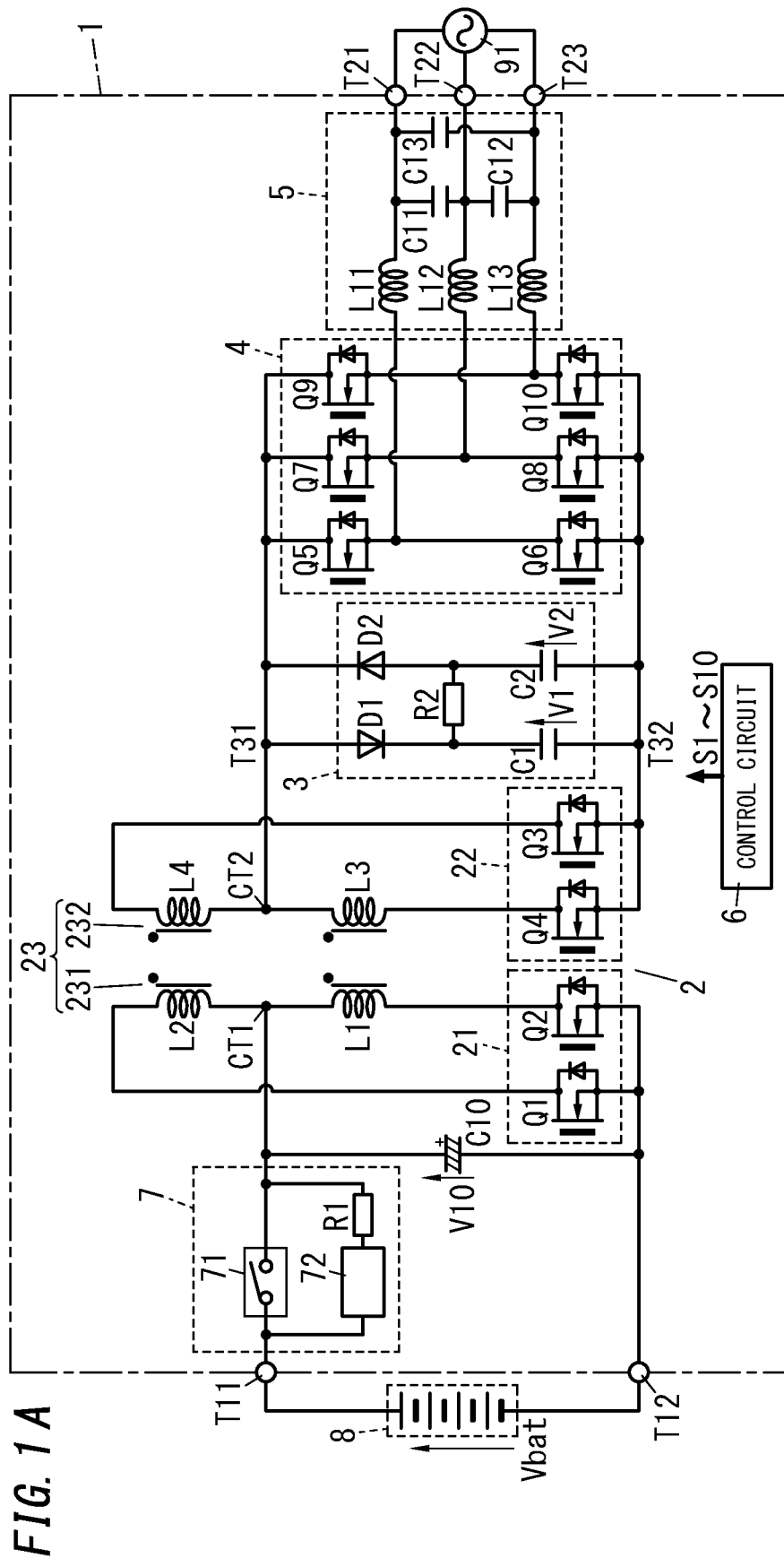
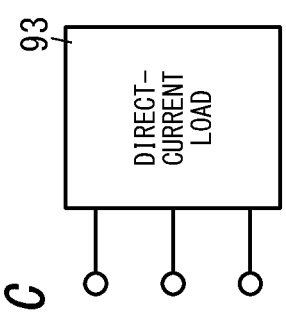
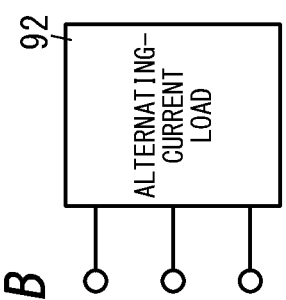
*FIG. 1A*
*FIG. 1B*
*FIG. 1C*

POWER CONVERSION SYSTEM

CROSS-REFERENCE OF RELATED APPLICATIONS

This application is the U.S. National Phase under 35 U.S.C. § 371 of International Patent Application No. PCT/JP2018/016498, filed on Apr. 23, 2018, which in turn claims the benefit of Japanese Application No. 2017-085307, filed on Apr. 24, 2017 and Japanese Application No. 2018-015695, filed on Jan. 31, 2018, the disclosures of which Applications are incorporated by reference herein.

TECHNICAL FIELD

The present disclosure generally relates to power conversion systems, and specifically, to a power conversion system configured to unidirectionally or bidirectionally transfer electric power.

BACKGROUND ART

Patent Literature 1 describes a bidirectional step-up/step-down chopper circuit which is of isolated type and which is connected between a battery and an electric double layer capacitor. The bidirectional step-up/step-down chopper circuit described in Patent Literature 1 includes a transformer provided with center taps. The center tap of a primary-side winding wire of the transformer is connected to a positive side of the battery via a reactor, and both ends of the primary-side winding wire are connected to a negative side of the battery via respective step-up chopper elements. The center tap of a secondary-side winding wire of the transformer is connected to one end of the electric double layer capacitor, and both ends of the secondary-side winding wire are connected to the other end of the electric double layer capacitor via respective step-down chopper elements. Moreover, between input terminals of the bidirectional step-up/step-down chopper circuit, a smoothing capacitor is connected.

It is, however, desirable in a bidirectional step-up/step-down chopper circuit (converter circuit) as described in Patent Literature 1, to reduce an inrush current to a (smoothing) capacitor when a direct-current power supply (battery) is electrically connected to the capacitor.

CITATION LIST

Patent Literature

Patent Literature 1: JP H07-23505 A

SUMMARY OF INVENTION

It is an object of the present disclosure to provide a power conversion system configured to reduce an inrush current to a capacitor when a direct-current power supply is electrically connected to the capacitor.

A power conversion system according to one aspect of the present disclosure is configured to unidirectionally or bidirectionally transfer electric power between a direct-current power supply and any one of an alternating-current grid, an alternating-current load, or a direct-current load. The power conversion system includes a capacitor, a converter circuit which is an isolated type converter circuit, and a control circuit. The capacitor is connected to the direct-current power supply via an inrush current prevention circuit. The inrush current prevention circuit is switchable at least between a high-impedance state where impedance is relatively high and a low-impedance state where the impedance is relatively low. The converter circuit includes a transformer having a primary winding wire and a secondary winding wire, and the capacitor is connected to the primary winding wire. The control circuit is configured to control the inrush current prevention circuit and the converter circuit. The control circuit is configured to cause the converter circuit to start operating and then switch the inrush current prevention circuit from the high-impedance state to the low-impedance state.

BRIEF DESCRIPTION OF DRAWINGS

FIG. 1A is a circuit diagram illustrating a power conversion system according to an embodiment of the present disclosure, and FIGS. 1B and 1C are block diagrams illustrating connection targets to be connected to the power conversion system;

DESCRIPTION OF EMBODIMENTS (1) Schema

Figure 2A:
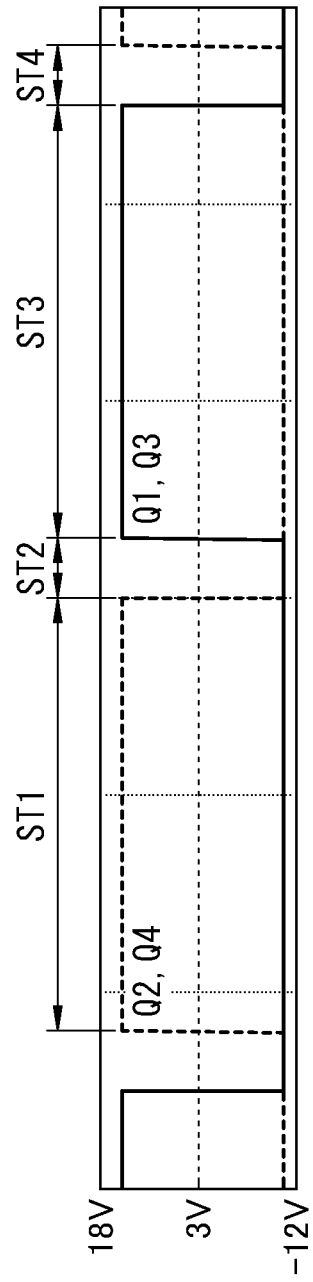
FIGS. 2A to 2D are views illustrating basic operation of the power conversion system.

A schema of a power conversion system 1 according to the present embodiment will be described with reference to FIG. 1A.

As illustrated in FIG. 1A, the power conversion system 1 according to the present embodiment is a bidirectional DC/AC inverter configured to bidirectionally transfer electric power between a direct-current power supply 8 and an alternating-current grid 91. The direct-current power supply 8 is, for example, a storage battery and is connected to the power conversion system 1 via a pair of first connection terminals T11 and T12. The alternating-current grid 91 is connected to the power conversion system 1 via a plurality of (in FIG. 1A, three) second connection terminals T21, T22, and T23. As used herein, the term "alternating-current grid" means the entirety of a system based on which an electricity supplier such as an electric power company supplies electric power to a power receiving facility of a consumer.

The power conversion system 1 according to the present embodiment converts direct-current power input from the direct-current power supply 8 into alternating-current power and outputs (transfers) the alternating-current power to the alternating-current grid 91. Moreover, the power conversion system 1 converts alternating-current power input from the alternating-current grid 91 into direct-current power and outputs the direct-current power to the direct-current power supply 8. In other words, to charge the storage battery, the power conversion system 1 converts the alternating-current power input from the alternating-current grid 91 into the direct-current power and outputs the direct-current power to the storage battery (charges the storage battery with the direct-current power). Moreover, to discharge the storage battery, the power conversion system 1 converts the direct-current power input from the storage battery into alternating-current power and outputs (discharges) the alternating-current power to the alternating-current grid 91.

As illustrated in FIGS. 1A to 1C, the power conversion system 1 according to the embodiment is a system configured to unidirectionally or bidirectionally transfer electric power between the direct-current power supply 8 and any one of the alternating-current grid 91, an alternating-current load 92, or a direct-current load 93. The power conversion system 1 includes a first capacitor (capacitor) C10, an isolated type converter circuit 2, and a control circuit 6. The first capacitor C10 is connected to the direct-current power supply 8 via an inrush current prevention circuit (gate circuit) 7 (hereinafter abbreviated to a "prevention circuit 7"). The prevention circuit 7 is switchable at least between a high-impedance state where impedance is relatively high and a low-impedance state where the impedance is relatively low.

The converter circuit 2 includes a transformer 23 having a primary winding wire 231 and a secondary winding wire 232, and the first capacitor C10 is connected to the primary winding wire 231. The control circuit 6 controls the prevention circuit 7 and the converter circuit 2. The control circuit 6 causes the converter circuit 2 to start operating and then switches the prevention circuit 7 from the high-impedance state to the low-impedance state.

As described above, since the converter circuit 2 is caused to operate with the prevention circuit 7 being in the high-impedance state, it is possible to reduce the inrush current to at least the first capacitor C10.

In the present embodiment, for example, a description is given of a case where a power storage system including the power conversion system 1 and the storage battery is introduced into a non-dwelling facility such as an office building, a hospital, a commercial facility, or a school.

(2) Configuration

A configuration of a power conversion system 1 according to the present embodiment will be described with reference to FIG. 1A.

As illustrated in FIG. 1A, the power conversion system 1 according to the present embodiment includes the first capacitor (capacitor) C10, the converter circuit 2, and the control circuit 6. The power conversion system 1 further includes a snubber circuit 3 and the prevention circuit 7. The power conversion system 1 still further includes an inverter circuit 4, a filter circuit 5, a pair of first connection terminals T11 and T12, and the plurality of (in FIG. 1A, three) second connection terminals T21, T22, and T23. Note that the prevention circuit 7 may, or may not, be included in the power conversion system 1.

In the example shown in FIG. 1A, the direct-current power supply 8 is electrically connected between the pair of first connection terminals T11 and T12 such that the first connection terminal T11 of the pair of first connection terminals T11 and T12 has a high potential (serves as the positive electrode). Moreover, the alternating-current grid 91 is electrically connected to the plurality of second connection terminals T21, T22, and T23. As used herein, the "terminal" does not have to be a component for connecting an electric wire and the like but may be, for example, a lead of an electronic component or part of a conductor included in a circuit board. The same applies to third connection terminals T31 and T32 which will be described later.

The first capacitor C10 is, for example, an electrolytic capacitor. As illustrated in FIG. 1A, the first capacitor C10 is electrically connected between the pair of first connection terminals T11 and T12 via the prevention circuit 7. The first capacitor C10 has a function of stabilizing the voltage between the pair of first connection terminals T11 and T12. In the following description, a voltage across the first capacitor C10 is denoted by "V10".

The converter circuit 2 is, for example, a DC/DC converter. As illustrated in FIG. 1A, the converter circuit 2 includes a first converter unit 21, a second converter unit 22, and the transformer 23. The first converter unit 21 includes a plurality of (in FIG. 1A, two) switching elements Q1 and Q2. The second converter unit 22 includes a plurality of (in FIG. 1A, two) switching elements Q3 and Q4. The transformer 23 includes the primary winding wire 231 and the secondary winding wire 232 which are magnetically coupled to each other. Each of the switching elements Q1 to Q4 is, for example, an n-channel depletion metal-oxide-semiconductor field effect transistor (MOSFET).

The transformer 23 is, for example, a high-frequency insulated transformer equipped with a center tap. The primary winding wire 231 of the transformer 23 includes a series circuit of two winding wires L1 and L2 with a primary-side center tap CT1 as a connection point. Similarly, the secondary winding wire 232 of the transformer 23 includes a series circuit of two winding wires L3 and L4 with a secondary-side center tap CT2 as a connection point. The primary-side center tap CT1 is electrically connected to a positive electrode-side terminal of the first capacitor C10. The secondary-side center tap CT2 is electrically connected to the third connection terminal T31 of the pair of third connection terminals T31 and T32, the third connection terminal T31 being on a high-potential side. The turns ratio of the winding wires L1, L2, L3, and L4 is, for example, 1:1:1:1. Note that the turns ratio of the winding wires L1, L2, L3, and L4 is arbitrarily changeable in accordance with a specification or the like.

Between both ends of the first capacitor C10, the switching element Q1 of the first converter unit 21 is electrically connected in series to the winding wire L2. Between the both ends of the first capacitor C10, the switching element Q2 of the first converter unit 21 is electrically connected in series to the winding wire L1. In other words, between the pair of first connection terminals T11 and T12, a series circuit of the switching element Q1 and the winding wire L2 is electrically connected in parallel to a series circuit of the switching element Q2 and the winding wire L1.

The switching element Q1 has a drain electrically connected to the primary-side center tap CT1 via the winding wire L2. The switching element Q2 has a drain electrically connected to the primary-side center tap CT1 via the winding wire L1. The switching elements Q1 and Q2 each have a source electrically connected to the first connection terminal T12 on a low-potential (negative-electrode) side. The switching elements Q1 and Q2 each have a gate electrically connected to the control circuit 6.

Between the pair of third connection terminals T31 and T32, the switching element Q3 of the second converter unit 22 is electrically connected in series to the winding wire L4. Between the pair of third connection terminals T31 and T32, the switching element Q4 of the second converter unit 22 is electrically connected in series to the winding wire L3. That is, between the pair of third connection terminals T31 and T32, a series circuit of the switching element Q3 and the winding wire L4 is electrically connected in parallel to a series circuit of the switching element Q4 and the winding wire L3.

The switching element Q3 has a drain electrically connected to the secondary-side center tap CT2 via the winding wire L4. The switching element Q4 has a drain electrically connected to the secondary-side center tap CT2 via the winding wire L3. The switching elements Q3 and Q4 each have a source electrically connected to the third connection terminal T32 on the low-potential (negative-electrode) side. Moreover, the switching elements Q3 and Q4 each have a gate electrically connected to the control circuit 6.

As illustrated in FIG. 1A, the snubber circuit 3 is electrically connected to the secondary winding wire 232 of the transformer 23. The snubber circuit 3 includes a plurality of (in FIG. 1A, two) diodes D1 and D2, a resistor R2, and a plurality of (in FIG. 1A, two) second capacitors C1 and C2. In other words, the snubber circuit 3 includes the second capacitors C1 and C2 being different from the first capacitor C10 and being connected to the secondary winding wire 232. In the present embodiment, an example in which the capacitance of the first capacitor C10 is equal to the capacitance of each of the second capacitors C1 and C2 will be described.

Between the pair of third connection terminals T31 and T32, the diode D1 is electrically connected in series to the second capacitor C1. Between the pair of third connection terminals T31 and T32, the diode D2 is electrically connected in series to the second capacitor C2.

The diode D1 has an anode electrically connected to the third connection terminal T31 on a high-potential (positive-electrode) side. The diode D1 has a cathode electrically connected to the third connection terminal T32 on the low-potential (negative-electrode) side via the second capacitor C1. The diode D2 has an anode electrically connected to the third connection terminal T32 via the second capacitor C2. The diode D2 has a cathode electrically connected to the third connection terminal T31. That is, the diode D1 and the diode D2 are connected in opposite directions to each other between the pair of third connection terminals T31 and T32. The resistor R2 is electrically connected between a connection point of the diode D1 to the second capacitor C1 and a connection point of the diode D2 to the second capacitor C2.

The inverter circuit 4 is a full-bridge three-phase inverter circuit including for example, six switching elements Q5 to Q10 in bridge connection. Each of the switching elements Q5 to Q10 is, for example, an n-channel depletion MOSFET. Between the pair of third connection terminals T31 and T32, the switching element Q5 is electrically connected in series to the switching element Q6. Between the pair of third connection terminals T31 and T32, the switching element Q7 is electrically connected in series to the switching element Q8. Between the pair of third connection terminals T31 and T32, the switching element Q9 is electrically connected in series to the switching element Q10. That is, a series circuit of the switching elements Q5 and Q6, a series circuit of the switching elements Q7 and Q8, and a series circuit of the switching elements Q9 and Q10 are electrically connected in parallel between the pair of third connection terminals T31 and T32.

The switching elements Q5, Q7, and Q9 each have a drain electrically connected to the third connection terminal T31 on the high-potential (positive-electrode) side. The switching elements Q6, Q8, and Q10 each have a source electrically connected to the third connection terminal T32 on the low-potential (negative-electrode) side. The switching element Q5 has a source electrically connected to the drain of the switching element Q6. The switching element Q7 has a source electrically connected to the drain of the switching element Q8. The switching element Q9 has a source electrically connected to the drain of the switching element Q10. The switching elements Q5 to Q10 each have a gate electrically connected to the control circuit 6.

The filter circuit 5 includes a plurality of (in FIG. 1A, three) inductors L11, L12, and L13 and a plurality of (in FIG. 1A, three) capacitors C11, C12, and C13. The inductor L11 has one end electrically connected to a connection point between the switching elements Q5 and Q6. The inductor L11 has the other end electrically connected to the second connection terminal T21. The inductor L12 has one end electrically connected a connection point between the switching elements Q7 and Q8. The inductor L12 has the other end electrically connected to the second connection terminal T22. The inductor L13 has one end electrically connected a connection point between the switching elements Q9 and Q10. The inductor L13 has the other end electrically connected to the second connection terminal T23.

The capacitor C11 is electrically connected between the other end of the inductor L11 and the other end of the inductor L12. The capacitor C12 is electrically connected between the other end of the inductor L12 and the other end of the inductor L13. The capacitor C13 is electrically connected between the other end of the inductor L11 and the other end of the inductor L13.

The control circuit 6 includes a microcomputer having a processor and memory. That is, the control circuit 6 is realized by a computer system including a processor and memory. The processor executes an appropriate program, thereby functioning as the control circuit 6. The program may be stored in the memory in advance, provided via a telecommunications network such as the Internet, or provided by a non-transitory storage medium such as a memory card storing the program.

The control circuit 6 is configured to control the converter circuit 2, the inverter circuit 4, and the prevention circuit 7. The control circuit 6 outputs, to the converter circuit 2, drive signals Si to S4 (hereinafter also denoted by "Sig3") for respectively driving the switching elements Q1 and Q2 of the first converter unit 21 and the switching elements Q3 and Q4 of the second converter unit 22. The control circuit 6 outputs, to the inverter circuit 4, drive signals S5 to S10 (hereinafter also denoted by "Sig4") for respectively driving the switching elements Q5 to Q10. The control circuit 6 outputs, to the prevention circuit 7, a drive signal Sig2 for driving a first openable/closable unit 71 which will be described later and a drive signal Sig1 for driving a second openable/closable unit 72 which will be described later.

The prevention circuit 7 is switchable among the high-impedance state, the low-impedance state, and an off-state. As used herein, the "high-impedance state" refers to a state where the impedance is relatively high, and the "low-impedance state" refers to a state where the impedance is relatively low. Moreover, the "off-state" refers to a state where the direct-current power supply 8 is electrically disconnected from the first capacitor C10. In the present embodiment, a resistor R1 connected in series to the second openable/closable unit 72 allows the prevention circuit 7 to be in the high impedance state.

As illustrated in FIG. 1A, the prevention circuit 7 includes the first openable/closable unit 71, the second openable/closable unit 72, and the resistor R1. The first openable/closable unit 71 is, for example, a mechanical relay. The first openable/closable unit 71 has one end serving as a fixed contact electrically connected to (the positive electrode of) the direct-current power supply 8 via the first connection terminal T11 and the other end serving as a movable contact electrically connected to (the positive electrode of) the first capacitor C10. The first openable/closable unit 71 mechanically breaks/makes an electrical path between the direct-current power supply 8 and the first capacitor C10 by the drive signal Sig2 from the control circuit 6. The first openable/closable unit 71 brings the prevention circuit 7 into the low-impedance state in a state where the direct-current power supply 8 is connected to the first capacitor C10 (that is, a state where the movable contact is in contact with the fixed contact).

The second openable/closable unit 72 is, for example, a Solid-State Relay (SSR), and an example of the semiconductor relay is a MOSFET relay. Between both ends of the first openable/closable unit 71, the second openable/closable unit 72 is electrically connected in series to the resistor R1. That is, between the direct-current power supply 8 and the first capacitor C10, the second openable/closable unit 72 is electrically connected in parallel to the first openable/closable unit 71. The second openable/closable unit 72 breaks/makes an electrical path between the direct-current power supply 8 and the first capacitor C10 by the drive signal Sig1 from the control circuit 6. The second openable/closable unit 72 brings the prevention circuit 7 into the high-impedance state in a state where the direct-current power supply 8 is connected to the first capacitor C10 (a state where electrical conduction is established between the direct-current power supply 8 and the first capacitor C10). Note that the off-state refers to a state where both the first openable/closable unit 71 and the second openable/closable unit 72 are OFF.

(3) Operation (3.1) Basic Operation

Figure 2B:
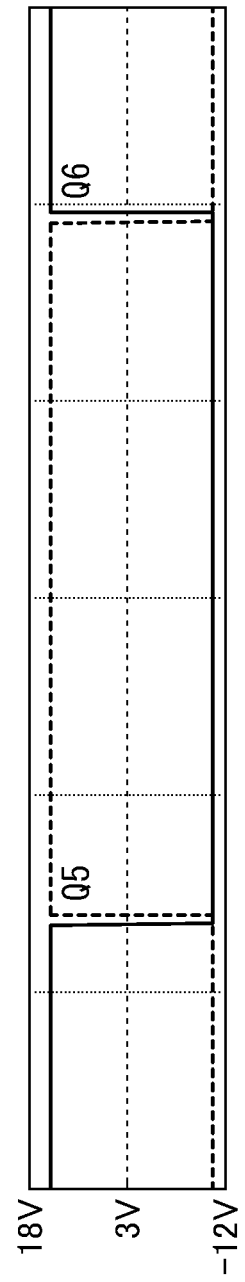
Figure 2C:
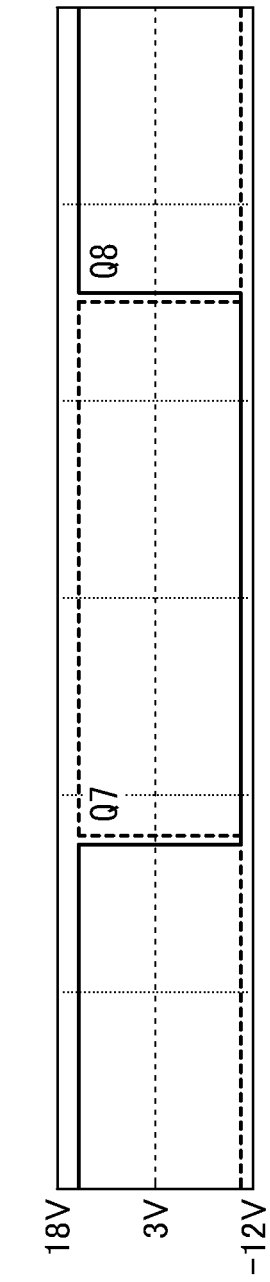
Figure 2D:
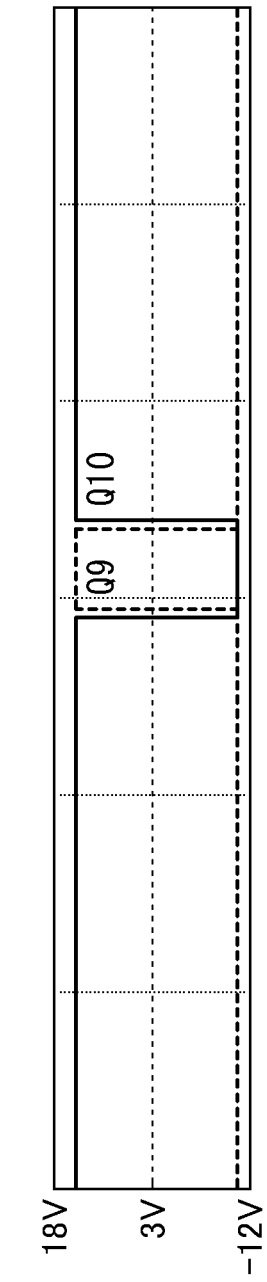

Basic operation of the power conversion system 1 according to the present embodiment will be described with reference to FIGS. 2A to 2D. FIG. 2A is a view illustrating turning on/off of the switching elements Q1 to Q4 of the converter circuit 2. FIG. 2B is a view illustrating turning on/off of the switching elements Q5 and Q6 of the inverter circuit 4. FIG. 2C is a view illustrating turning on/off of the switching elements Q7 and Q8 of the inverter circuit 4. FIG. 2D is a view illustrating turning on/off of the switching elements Q9 and Q10 of the inverter circuit 4.

The power conversion system 1 according to the present embodiment is configured to bidirectionally convert (transfer) electric power between a set of the first connection terminals T11 and T12 and a set of the second connection terminals T21, T22, and T23 via the transformer 23. That is, the power conversion system 1 has two operation modes, namely, an inverter mode and a converter mode. The inverter mode is an operation mode in which direct-current power input to the first connection terminals T11 and T12 is converted into alternating-current power, and the alternating-current power is output from the second connection terminals T21, T22, and T23. The converter mode is an operation mode in which alternating-current power input to the second connection terminals T21, T22, and T23 is converted into direct-current power, and the direct-current power is output from the first connection terminals T11 and T12.

An example is described below in which a voltage between the first connection terminals T11 and T12 (that is, a voltage across the direct-current power supply 8) is a voltage Vbat, and the operation mode of the power conversion system 1 is the inverter mode. Moreover, in the example, the drive frequency of each of the switching element Q1 to Q4 is 20 kHz, and the duty ratio of each of the switching elements Q1 to Q4 is 50%.

The control circuit 6 outputs the drive signals Si to S4 to the first converter unit 21 and the second converter unit 22 such that the switching elements Q2 and Q4 are on and the switching elements Q1 and Q3 are off during a first time period ST1. Thus, a voltage across the winding wire L1 of the primary winding wire 231 is +Vbat, and a voltage across the winding wire L2 of the primary winding wire 231 is −Vbat. Moreover, a voltage across the winding wire L3 of the secondary winding wire 232 is +Vbat, and a voltage across the winding wire L4 of the secondary winding wire 232 is −Vbat. As a result, the potential of the third connection terminal T31 based on the third connection terminal T32 is +Vbat.

The control circuit 6 outputs the drive signals S5 to S10 to the inverter circuit 4 such that the switching elements Q6, Q8, and Q10 are OFF and the switching elements Q5, Q7, and Q9 are ON during a second time period ST2. This achieves a circulation mode in which a current circulates in the inverter circuit 4. At this time, all of the switching elements Q1 to Q4 of the converter circuit 2 are OFF (see FIG. 2A).

The control circuit 6 outputs the drive signals Si to S4 to the first converter unit 21 and the second converter unit 22 such that the switching elements Q1 and Q3 are ON and the switching elements Q2 and Q4 are OFF during a third time period ST3. Thus, a voltage across the winding wire L1 of the primary winding wire 231 is −Vbat, and a voltage across the winding wire L2 of the primary winding wire 231 is +Vbat. Moreover, a voltage across the winding wire L3 of the secondary winding wire 232 is −Vbat, and a voltage across the winding wire L4 of the secondary winding wire 232 is +Vbat. As a result, the potential of the third connection terminal T31 based on the third connection terminal T32 is +Vbat.

The control circuit 6 outputs the drive signals S5 to S10 to the inverter circuit 4 such that the switching elements Q5, Q7, and Q9 are OFF and the switching elements Q6, Q8, and Q10 are ON during a fourth time period ST4. This achieves a circulation mode in which a current circulates in the inverter circuit 4. At this time, all of the switching elements Q1 to Q4 of the converter circuit 2 are OFF (see FIG. 2A).

The converter circuit 2 (the first converter unit 21 and the second converter unit 22) repeats the operations during the above-described first time period ST1, second time period ST2, third time period ST3, and fourth time period ST4. Thus, the potential of the third connection terminal T31 with respect to the third connection terminal T32 is maintained at +Vbat and is supplied to the inverter circuit 4. That is, the inverter circuit 4 is supplied with a constant voltage Vbat, and therefore, inverting a voltage in the inverter circuit 4 is not necessary, and thus, the inverter circuit 4 can be formed of a general full-bridge circuit.

(3.2) Operation when Direct-Current Power Supply is Electrically Connected to Capacitors C1 and C2

Next, operation of the power conversion system 1 when the direct-current power supply 8 is electrically connected to the second capacitors C1 and C2 will be described with reference to FIG. 3. In the power conversion system 1 according to the present embodiment, the power conversion system 1 is operated according to the operation sequence shown in FIG. 3 to be able to reduce an inrush current to the first capacitor C10 and the second capacitors C1 and C2 when the direct-current power supply 8 is electrically connected to the second capacitors C1 and C2.

Figure 3:
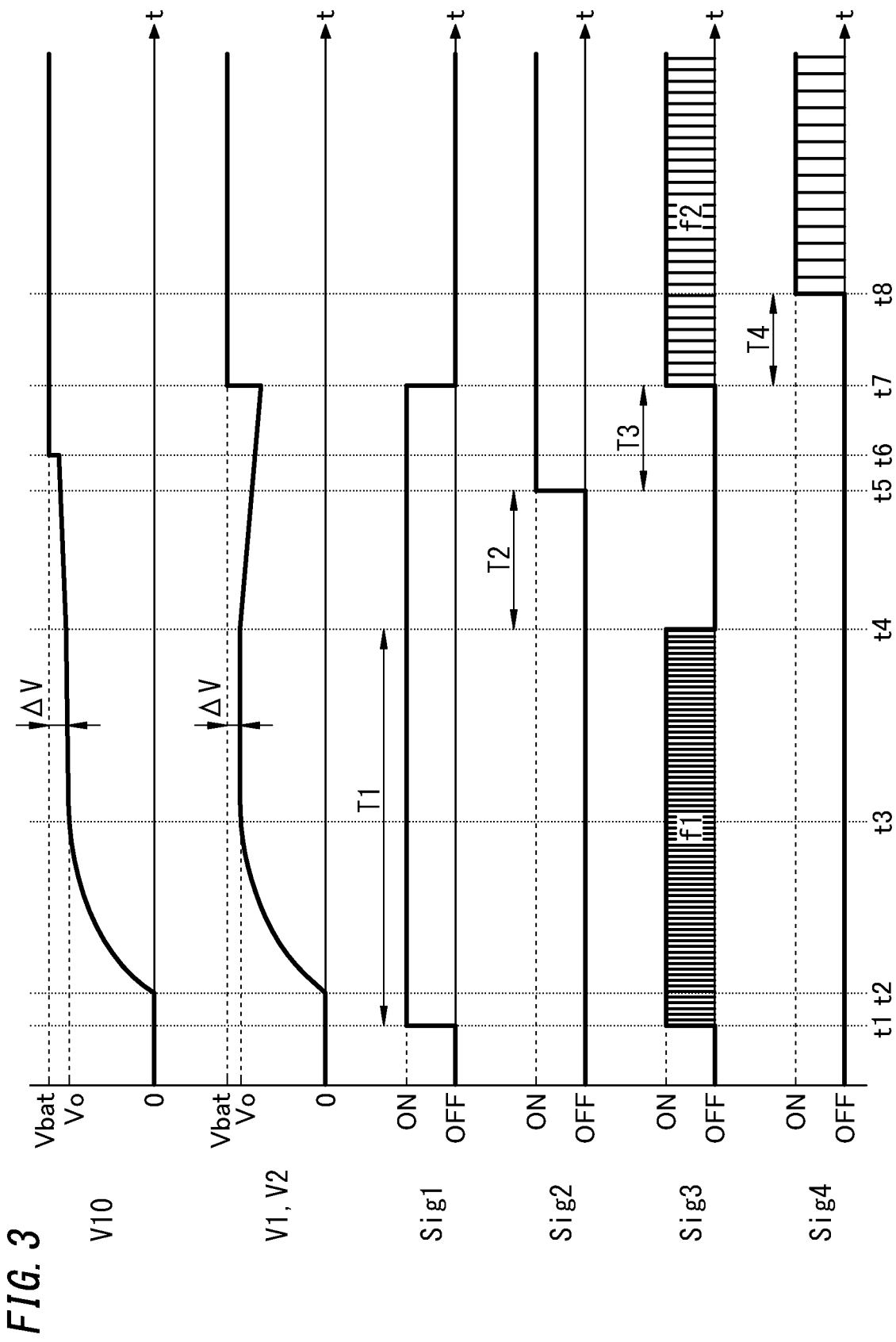
FIG. 3 is a timing chart illustrating operation at start-up of the power conversion system.

In FIG. 3, "Sig1" is a drive signal for the second openable/closable unit 72, and "Sig2" is a drive signal for the first openable/closable unit 71. In FIG. 3, "Sig3" is a drive signal for the converter circuit 2, and "Sig4" is a drive signal for the inverter circuit 4. In FIG. 3, "V10" is a voltage across the first capacitor C10, and "V1, V2" are voltages across the second capacitors C1 and C2.

In FIG. 3, "time period T1" is an operation time period of the converter circuit 2 when the prevention circuit 7 is in the high-impedance state, and "time period T2" is a time period from stopping of the converter circuit 2 to turning ON of the first openable/closable unit 71. In FIG. 3, "time period T3" is a stand-by time until the first openable/closable unit 71 is turned ON, and "time period T4" is a time period from stating of operation of the converter circuit 2 to starting of operation of the inverter circuit 4.

In the initial state, both the first openable/closable unit 71 and the second openable/closable unit 72 are in an open state, and all of the switching elements Q1 to Q10 are in an OFF state.

The control circuit 6 starts outputting the drive signal Sig1 to the second openable/closable unit 72 at time t1. The control circuit 6 also outputs the drive signal Sig3 to the converter circuit 2 at the time t1. In the converter circuit 2, the switching elements Q1 to Q4 are turned ON/OFF in accordance with the drive signal Sig3. At this time, each of the switching elements Q1 to Q4 has a drive frequency f1 (hereinafter also referred to as a "first frequency f1") of 60 kHz, and each of the switching elements Q1 to Q4 has a duty ratio of 50%. At time t2, the second openable/closable unit 72 is turned ON, and the first capacitor C10 is started to be charged.

Here, since the resistor R1 is connected in series to the second openable/closable unit 72, the first capacitor C10 is charged according to a time constant given by the resistor R1 and the first capacitor C10 (see FIG. 3). Moreover, since the converter circuit 2 is operating, the second capacitors C1 and C2 are charged according to the time constant same as that of the first capacitor C10 (see FIG. 3). Then, at time t3, a voltage V10 across the first capacitor C10 and voltages V1 and V2 respectively across the second capacitors C1 and C2 are charged to a voltage Vo. Here, the voltages V10, V1, and V2 respectively across the first capacitor C10, and the second capacitors C1 and C2 are charged only to the voltage Vo due to iron loss of the transformer 23 of the converter circuit 2, and a voltage difference ΔV occurs between the voltage Vo and the voltage Vbat applied by the direct-current power supply 8.

The control circuit 6 stops the converter circuit 2 at time t4 so that the voltage V10 across the first capacitor C10 reaches the voltage Vbat. As a result, the voltage V10 across the first capacitor C10 gradually increases to the voltage Vbat as shown in FIG. 3. On the other hand, the voltages V1 and V2 decrease due to self-discharge respectively of the second capacitors C1 and C2 as illustrated in FIG. 3.

The control circuit 6 outputs the drive signal Sig2 to the first openable/closable unit 71 at time t5, that is, when the time period T2 has elapsed since the converter circuit 2 was stopped. This turns ON the first openable/closable unit 71, wherein since the first openable/closable unit 71 is a mechanical relay, the first openable/closable unit 71 is turned ON at time t6. At this time, turning ON of the first openable/closable unit 71 enables the amount of the voltage drop across the resistor R1 to be deemed to be zero, and the voltage V10 across the first capacitor C10 equals the voltage Vbat as illustrated in FIG. 3. On the other hand, since the converter circuit 2 is in a stopped state, the voltages V1 and V2 further decrease due to self-discharge of the second capacitors C1 and C2. Note that during the time period T2, the converter circuit 2 is in the stopped state, and the second capacitors C1 and C2 are self-discharged, and therefore, the time period T2 is preferably a short time period.

At time t7, that is, when the time period T3 has elapsed since the drive signal Sig2 was output to the first openable/closable unit 71, the control circuit 6 outputs the drive signal Sig3 to the converter circuit 2 so as to resume the operation of the converter circuit 2. At this time, each of the switching elements Q1 to Q4 has a drive frequency f2 (hereinafter also referred to as a "second frequency f2") of 20 kHz, and each of the switching elements Q1 to Q4 has a duty ratio of 50%. Moreover, the control circuit 6 stops outputting the drive signal Sig1 to the second openable/closable unit 72 at time t7. Thus, the second openable/closable unit 72 is turned OFF. At this time, each of the voltages V1 and V2 respectively across the second capacitors C1 and C2 equals the voltage Vbat since the converter circuit 2 is operating (see FIG. 3). Then, the control circuit 6 outputs the drive signal Sig4 to the inverter circuit 4 at time t8 to cause the inverter circuit 4 to start operating.

In the present embodiment, as described above, the operation of the converter circuit 2 is started, and then, the prevention circuit 7 is switched from the high-impedance state to the low-impedance state. In this case, it is possible to reduce the inrush current to the second capacitors C1 and C2 more than in a case where the operation of the converter circuit 2 is started after the prevention circuit 7 is switched from the high-impedance state to the low-impedance state.

Moreover, in the present embodiment, as described above, the converter circuit 2 is caused to operate when the prevention circuit 7 is in the high-impedance state. In this case, it is possible to reduce the inrush current to the second capacitors C1 and C2 more than in the case where the converter circuit 2 is caused to operate when the prevention circuit 7 is in the low-impedance state.

Further, in the present embodiment, as described above, the first frequency f1 of the converter circuit 2 with the prevention circuit 7 being in the high-impedance state (during the time period T1 in FIG. 3) is higher than the second frequency f2 of the converter circuit 2 with the prevention circuit 7 being in the low-impedance state (at a steady state). In this case, it is possible to reduce the iron loss of the transformer 23 more than in a case where the first frequency f1 is lower than or equal to the second frequency f2.

Furthermore, in the present embodiment, as described above, the converter circuit 2 is stopped before the drive frequency of the converter circuit 2 is switched from the first frequency f1 to the second frequency f2. In this case, it is possible to reduce the influence of the iron loss more than in a case were the converter circuit 2 is not stopped.

Moreover, in the present embodiment, as described above, when a specified time (a period from the time t1 to the time t5) has elapsed since the operation of the converter circuit 2 was started, the prevention circuit 7 is switched to the low-impedance state. In this case, it is possible to reduce the inrush current to the first capacitor C10 and the second capacitors C1 and C2 more than in a case where the prevention circuit 7 is switched to the low-impedance state before the specified time elapses.

Further, in the present embodiment, as described above, the operation of the converter circuit 2 is started at a switching timing at which the prevention circuit 7 is switched from the off-state to the high-impedance state. In this case, it is possible to reduce the inrush current to the second capacitors C1 and C2 more than in a case where the operation of the converter circuit 2 is started after the switching timing.

(4) Variation

The above-described embodiment is a mere example of various embodiments of the present disclosure. Various modifications are possible depending on design and the like as long as the object of the present disclosure can be achieved. Variations of the above-described embodiment will be described below. Note that any of the variations to be described below may be combined as appropriate.

(4.1) First Variation

Figure 4:
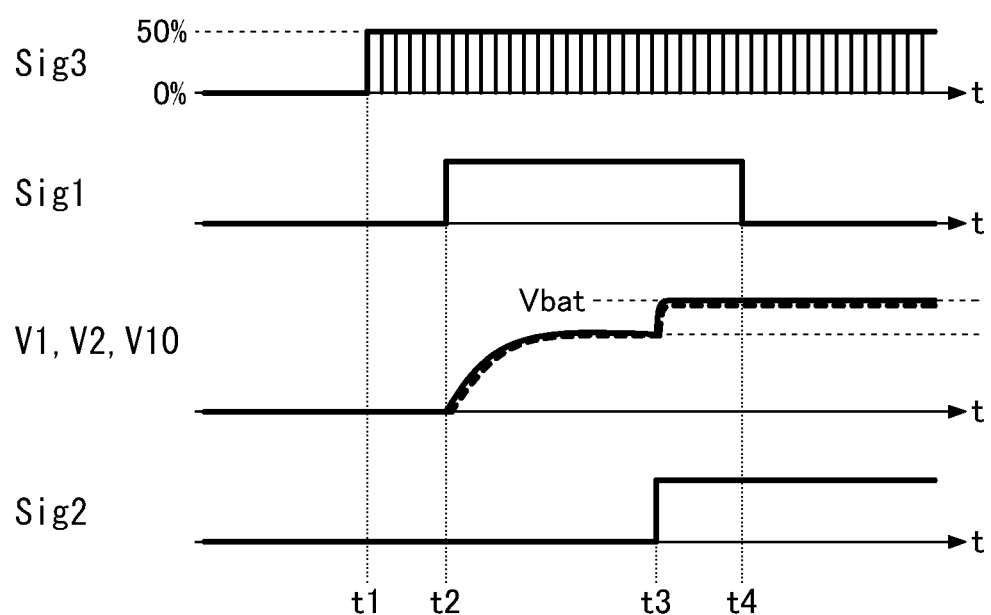
FIG. 4 is a timing chart illustrating operation at start-up of a power conversion system according to a first variation of the embodiment of the present disclosure.

Another operation sequence of the power conversion system 1 according to the present embodiment will be described with reference to FIG. 4. In FIG. 4, "Sig1" is a drive signal for the second openable/closable unit 72, and "Sig2" is a drive signal for the first openable/closable unit 71, and "Sig3" is a drive signal for the converter circuit 2. In FIG. 4, "V1" is a voltage across the second capacitor C1, "V2" is a voltage across the second capacitor C2, and "V10" is a voltage across the first capacitor C10. Note that the drive frequency of the converter circuit 2 is, for example, 20 kHz.

The control circuit 6 outputs the drive signal Sig3 to the converter circuit 2 at time t1. In the converter circuit 2, the switching elements Q1 to Q4 are turned ON/OFF in accordance with the drive signal Sig3.

The control circuit 6 starts outputting the drive signal Sig1 to the second openable/closable unit 72 at time t2. Thus, the second openable/closable unit 72 is turned ON. The first capacitor C10 is charged according to a time constant given by the resistor R1 and the first capacitor C10 connected in series to the second openable/closable unit 72 when the second openable/closable unit 72 is turned ON. Moreover, at this time, the converter circuit 2 is operating, and therefore, both the second capacitors C1 and C2 are also charged according to the time constant same as that of the first capacitor C10.

The control circuit 6 outputs the drive signal Sig2 to the first openable/closable unit 71 at time t3. Thus, the first openable/closable unit 71 is turned ON. When the first openable/closable unit 71 is turned ON, each of the voltage V10 across the first capacitor C10 and the voltages V1 and V2 respectively across the second capacitors C1 and C2 equals the voltage Vbat.

Then, the control circuit 6 stops outputting the drive signal Sig1 at time t4 to turn OFF the second openable/closable unit 72.

Also in the present variation, causing the converter circuit 2 and the prevention circuit 7 to operate in accordance with the operation sequence shown in FIG. 4 enables the inrush current to the first capacitor C10 and the second capacitors C1 and C2 to be reduced.

(4.2) Second Variation

In the above-described embodiment, at the start-up and stopping of the converter circuit 2, the duty ratio of the converter circuit 2 is changed from 0% to 50%. In contrast, as illustrated in FIG. 5A, the duty ratio may be continuously changed over time such that the duty ratio reaches 50% when a definite time period has elapsed since the converter circuit 2 was started up.

Figure 5A:
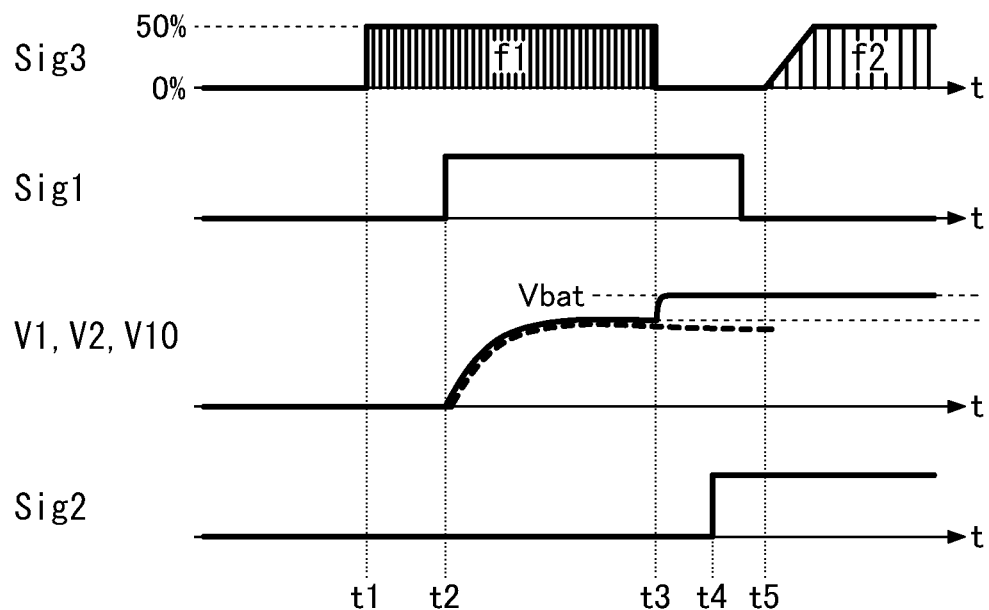
FIG. 5A is a timing chart illustrating operation at start-up of a power conversion system according to a second variation of the embodiment of the present disclosure.

FIG. 5A shows an example at the start-up of the converter circuit 2, but alternatively, the duty ratio may be continuously changed over time when the converter circuit 2 is stopped. In this case, the duty ratio is continuously changed from 50% to 0% over time such that the duty ratio is 0% when a definite time period has elapsed since the converter circuit 2 was stopped. In other words, at least at one of the start-up or the stopping of the converter circuit 2, the duty ratio of the converter circuit 2 may be continuously changed over time.

(4.3) Third Variation

Figure 5B:
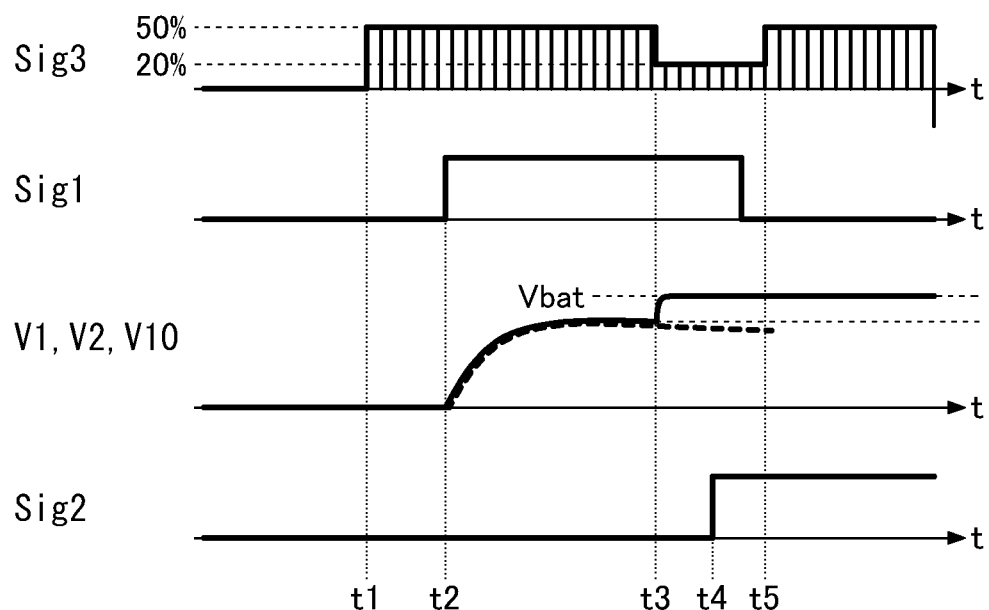
FIG. 5B is a timing chart illustrating operation at start-up of a power conversion system according to a third variation of the embodiment of the present disclosure.

In the above-described embodiment, an example in which the duty ratio of the converter circuit 2 is 50% has been described. However, the duty ratio of the converter circuit 2 is not limited to 50%. The duty ratio of the converter circuit 2 may be, for example, 20% as shown in FIG. 5B or any other percentage. That is, the duty ratio of the converter circuit 2 may be arbitrarily set in accordance with a specification or the like.

(4.4) Fourth Variation

Figure 6A:
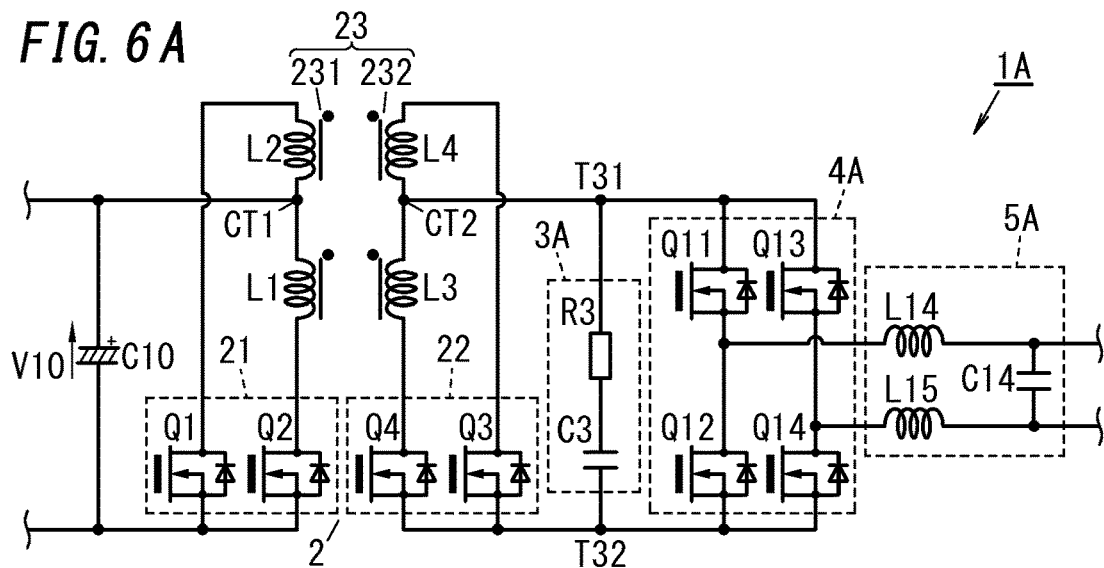
FIG. 6A is a circuit diagram illustrating a power conversion system according to a fourth variation of the embodiment of the present disclosure.

In the above-described embodiment, an example in which the inverter circuit 4 is a three-phase inverter circuit has been described. However, the inverter circuit 4 may be a single phase inverter circuit as illustrated in FIG. 6A. A configuration of a power conversion system 1A according to a fourth variation will be described with reference to FIG. 6A. Note that components other than a snubber circuit 3A, an inverter circuit 4A, and a filter circuit 5A are similar to those in the above-described power conversion system 1 and are denoted by the same reference signs as those in the above-described power conversion system 1, and the detailed description thereof is omitted. Moreover, in FIG. 6A, for simplification of the drawing, a control circuit 6, a prevention circuit 7, a pair of first connection terminals, and a pair of second connection terminals are omitted.

The power conversion system 1A according to the fourth variation is, for example, a bidirectional DC/AC inverter. As illustrated in FIG. 6A, the power conversion system 1A includes a first capacitor C10, a converter circuit 2, the control circuit 6 (see FIG. 1A), the prevention circuit 7 (see FIG. 1A), the pair of first connection terminals, and the pair of second connection terminals. The power conversion system 1A further includes the snubber circuit 3A, the inverter circuit 4A, and the filter circuit 5A.

As illustrated in FIG. 6A, the snubber circuit 3A includes a resistor R3 and a second capacitor C3. The resistor R3 has one end electrically connected to a third connection terminal T31 on the high-potential (positive-electrode) side. The resistor R3 has the other end electrically connected to one end of the second capacitor C3. The second capacitor C3 has the other end electrically connected to a third connection terminal T32 on the low-potential (negative-electrode) side. That is, between the third connection terminals T31 and T32 which are paired, a series circuit of the resistor R3 and the second capacitor C3 is electrically connected.

The inverter circuit 4A is a full-bridge inverter circuit including four switching elements Q11 to Q14 in bridge connection. Each of the switching elements Q11 to Q14 is, for example, an n-channel depletion MOSFET. Between the pair of third connection terminals T31 and T32, the switching element Q11 is electrically connected in series to the switching element Q12. Between the pair of third connection terminals T31 and T32, the switching element Q13 is electrically connected in series to the switching element Q14. That is, between the pair of third connection terminals T31 and T32, a series circuit of the switching elements Q11 and Q12 and a series circuit of the switching elements Q13 and Q14 are electrically connected in parallel to each other.

The switching elements Q11 and Q13 each have a drain electrically connected to the third connection terminal T31. The switching elements Q12 and Q14 each have a source electrically connected to the third connection terminal T32. The switching element Q11 has a source electrically connected to the drain of the switching element Q12. The switching element Q13 has a source electrically connected to the drain of the switching element Q14. The switching elements Q11 to Q14 each have a gate electrically connected to the control circuit 6.

The filter circuit 5A includes a plurality of (in FIG. 6A, two) inductors L14 and L15 and a capacitor C14. The inductor L14 has one end electrically connected a connection point between the switching elements Q11 and Q12. The inductor L14 has the other end electrically connected to one of the pair of second connection terminals. The inductor L15 has one end electrically connected to a connection point between the switching elements Q13 and Q14. The inductor L15 has the other end electrically connected to the other of the pair of second connection terminals. The capacitor C14 is electrically connected between the other end of the inductor L14 and the other end of the inductor L15.

Also in the present variation, causing the converter circuit 2 and the prevention circuit 7 to operate in accordance with the above-described operation sequence enables the inrush current to the first capacitor C10 and the second capacitor C3 to be reduced.

(4.5) Fifth Variation

Figure 6B:
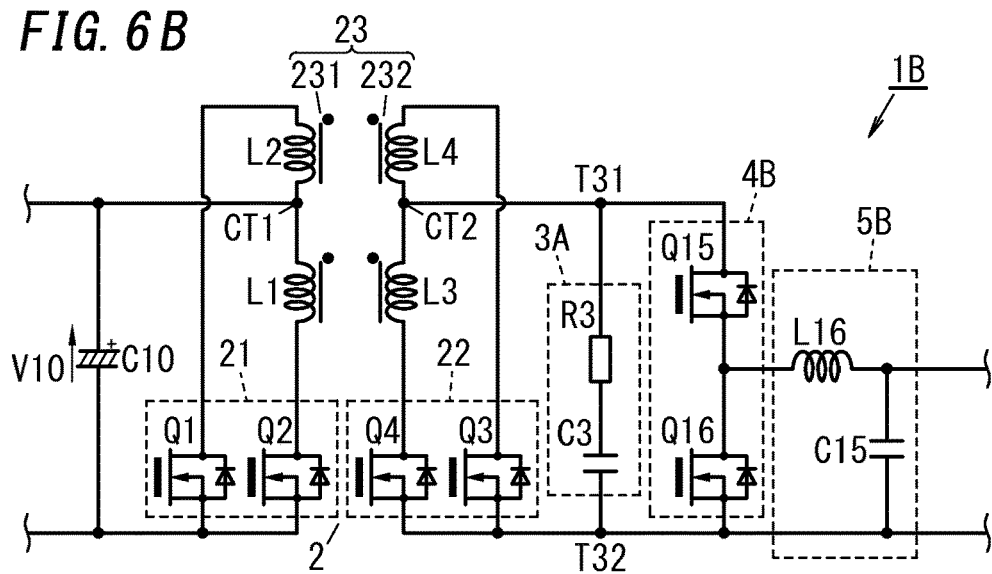
FIG. 6B is a circuit diagram illustrating a power conversion system according to a fifth variation of the embodiment of the present disclosure.

In the fourth variation, an example in which the power conversion system 1A is a bidirectional DC/AC inverter has been described. However, as illustrated in FIG. 6B, the power conversion system 1A may be a bidirectional DC/DC converter. A configuration of a power conversion system 1B according to a fifth variation will be described with reference to FIG. 6B. Note that components other than a converter circuit 4B and a filter circuit 5B are similar to those in the above-described power conversion system 1A, are denoted by the same reference signs as those in the above-described power conversion system 1A, and the detailed description thereof is omitted. Moreover, in FIG. 6B, for simplification of the drawing, a control circuit 6, a prevention circuit 7, a pair of first connection terminals, and a pair of second connection terminals are omitted.

The power conversion system 1B according to the fifth variation is, for example, a bidirectional DC/DC converter. As illustrated in FIG. 6B, the power conversion system 1B includes a first capacitor C10, a converter circuit 2, the control circuit 6 (see FIG. 1A), the prevention circuit 7 (see FIG. 1A), the pair of first connection terminals, and the pair of second connection terminals. Moreover, the power conversion system 1B further includes a snubber circuit 3A, the converter circuit 4B, and the filter circuit 5B.

The converter circuit 4B is a half-bridge converter circuit including two switching elements Q15 and Q16 which are connected in series to each other. Each of the switching elements Q15 and Q16 is, for example, an n-channel depletion MOSFET. Between a pair of third connection terminals T31 and T32, the switching element Q15 is electrically connected in series to the switching element Q16.

The switching element Q15 has a drain electrically connected to the third connection terminal T31 on the high-potential (positive-electrode) side. The switching element Q16 has a source electrically connected to the third connection terminal T32 on the low-potential (negative-electrode) side. The switching element Q15 has a source electrically connected to the drain of the switching element Q16. The switching elements Q15 and Q16 each have a gate electrically connected to the control circuit 6.

The filter circuit 5B includes an inductor L16 and a capacitor C15. The inductor L16 has one end electrically connected a connection point between the switching elements Q15 and Q16. The inductor L16 has the other end electrically connected to one of the pair of second connection terminals. The capacitor C15 is electrically connected between the other end of the inductor L16 and the other of the pair of second connection terminals.

Also in the present variation, causing the converter circuit 2 and the prevention circuit 7 to operate in accordance with the above-described operation sequence enables the inrush current to the first capacitor C10 and the second capacitor C3 to be reduced.

(4.6) Sixth Variation

In the fifth variation, an example in which the power conversion system 1B bidirectionally transfers (converts) electric power has been described, but the power conversion system 1B may be configured to unidirectionally transfer electric power. A configuration of a power conversion system 1C according to a sixth variation will be described with reference to FIG. 6C. Note that components other than converter circuits 2C and 4C are similar to those in the above-described power conversion system 1B, are denoted by the same reference signs as those in the above-described power conversion system 1B, and the detailed description thereof is omitted. Moreover, in FIG. 6C, for simplification of the drawing, a control circuit 6, a prevention circuit 7, a pair of first connection terminals, and a pair of second connection terminals are omitted. Moreover, in the present variation, a case where electric power is transferred from an alternating-current grid 91 to a direct-current power supply 8 will be described.

Figure 6C:
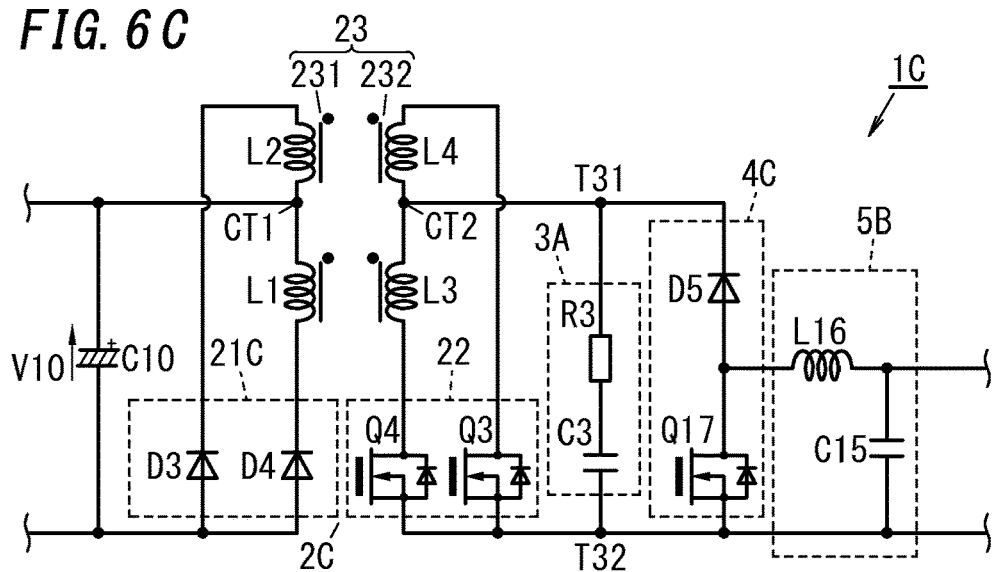
FIG. 6C is a circuit diagram illustrating a power conversion system according to a sixth variation of the embodiment of the present disclosure.

The power conversion system 1C according to the sixth variation is, for example, a step-up DC/DC converter. As illustrated in FIG. 6C, the power conversion system 1C includes a first capacitor C10, the converter circuit 2C, the control circuit 6 (see FIG. 1A), the prevention circuit 7 (see FIG. 1A), the pair of first connection terminals, and the pair of second connection terminals. Moreover, the power conversion system 1C further includes a snubber circuit 3A, the converter circuit 4C, and the filter circuit 5B.

As illustrated in FIG. 6C, the converter circuit 2C includes a first converter unit 21C, a second converter unit 22, and the transformer 23. Note that the second converter unit 22 and the transformer 23 are similar to those in the above-described embodiments, and the detailed description is omitted herein. The first converter unit 21C includes two diodes D3 and D4. The diode D3 has an anode electrically connected to one end (negative electrode-side end) of the first capacitor C10. The diode D3 has a cathode electrically connected to a winding wire L2 of a primary winding wire 231. The diode D4 has an anode electrically connected to one end (negative electrode-side end) of the first capacitor C10. The diode D4 has a cathode electrically connected to a winding wire L1 of the primary winding wire 231.

As illustrated in FIG. 6C, the converter circuit 4C includes a switching element Q17 and a diode D5. The switching elements Q17 are, for example, an n-channel depletion MOSFET. Between a pair of third connection terminals T31 and T32, the switching element Q17 is electrically connected in series to the diode D5.

The switching element Q17 has a drain electrically connected to the anode of the diode D5. The diode D5 has a cathode electrically connected to the third connection terminal T31 on the high-potential (positive-electrode) side. The switching element Q17 has a source electrically connected to the third connection terminal T32 on the low-potential (negative-electrode) side. A connection point between the switching element Q17 and the diode D5 is electrically connected to one end of the inductor L16 of the filter circuit 5B. The switching element Q17 has a gate electrically connected to the control circuit 6.

Also in the present variation, causing the converter circuit 2C and the prevention circuit 7 to operate in accordance with the above-described operation sequence enables the inrush current to the first capacitor C10 and the second capacitor C3 to be reduced.

(4.7) Seventh Variation

Figure 7A:
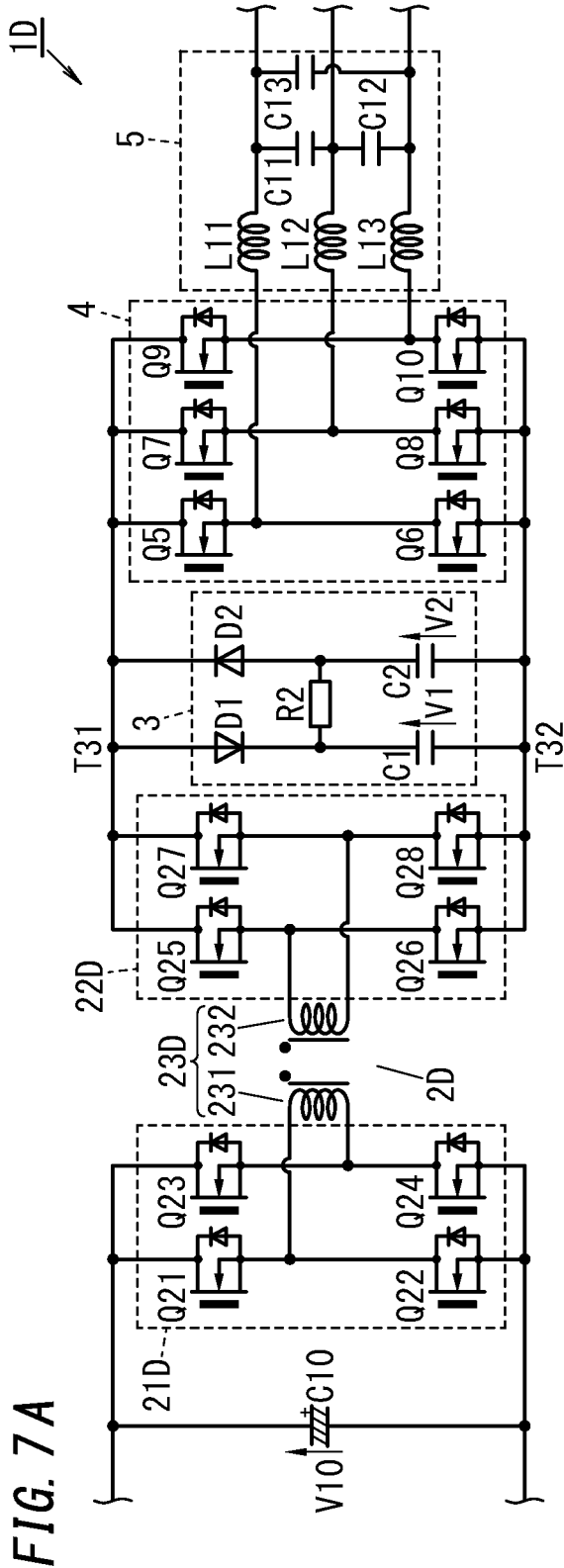
FIG. 7A is a circuit diagram illustrating a power conversion system according to a seventh variation of the embodiment of the present disclosure.

In the above-described embodiment, an example in which the converter circuit 2 is a center-tap converter circuit has been described, but as illustrated in FIG. 7A, the converter circuit 2 may be a full-bridge converter circuit. A configuration of a power conversion system 1D according to a seventh variation will be described with reference to FIG. 7A. Note that components other than a converter circuit 2D are similar to those in the above-described power conversion system 1, are denoted by the same reference signs as those in the above-described power conversion system 1, and the detailed description thereof is omitted. Moreover, in FIG. 7A, for simplification of the drawing, a control circuit 6, a prevention circuit 7, a pair of first connection terminals, and a plurality of second connection terminals are omitted.

The power conversion system 1D according to the seventh variation is, for example, a bidirectional DC/AC inverter. As illustrated in FIG. 7A, the power conversion system 1D includes a first capacitor C10, a converter circuit 2D, the control circuit 6 (see FIG. 1A), the prevention circuit 7 (see FIG. 1A), the pair of first connection terminals, and the plurality of second connection terminals. Moreover, the power conversion system 1D further includes a snubber circuit 3, an inverter circuit 4, and a filter circuit 5.

As illustrated in FIG. 7A, the converter circuit 2D includes a first converter unit 21D, a second converter unit 22D, and the transformer 23D.

The first converter unit 21D is a full-bridge converter circuit including four switching elements Q21 to Q24 in bridge connection. Each of the switching elements Q21 to Q24 is, for example, an n-channel depletion MOSFET. Between both ends of the first capacitor C10, the switching element Q21 is electrically connected in series to the switching element Q22. Between the both ends of the first capacitor C10, the switching element Q23 is electrically connected in series to the switching element Q24. That is, between the both ends of the first capacitor C10, a series circuit of the switching elements Q21 and Q22 and a series circuit of the switching elements Q23 and Q24 are electrically connected in parallel to each other.

The switching elements Q21 and Q23 each have a drain electrically connected to one end (positive-electrode-side end) of the first capacitor C10. The switching elements Q22 and Q24 each have a source electrically connected to the other end (negative-electrode-side end) of the first capacitor C10. The switching element Q21 has a source electrically connected to the drain of the switching element Q22. The switching element Q23 has a source electrically connected to the drain of the switching element Q24. The switching elements Q21 to Q24 each have a gate electrically connected to the control circuit 6.

The second converter unit 22D is a full-bridge converter circuit including four switching elements Q25 to Q28 in bridge connection. Each of the switching elements Q25 to Q28 is, for example, an n-channel depletion MOSFET. Between a pair of third connection terminals T31 and T32, the switching element Q25 is electrically connected in series to the switching element Q26. Between the pair of third connection terminals T31 and T32, the switching element Q27 is electrically connected in series to the switching element Q28. That is, between both ends of the pair of third connection terminals T31 and T32, a series circuit of the switching elements Q25 and Q26 and a series circuit of the switching elements Q27 and Q28 are electrically connected in parallel to each other.

The switching elements Q25 and Q27 each have a drain electrically connected to the third connection terminal T31 on the high-potential (positive-electrode) side. The switching elements Q26 and Q28 each have a source electrically connected to the third connection terminal T32 on the low-potential (negative-electrode) side. The switching element Q25 has a source electrically connected to the drain of the switching element Q26. The switching element Q27 has a source electrically connected to the drain of the switching element Q28. The switching elements Q25 to Q28 each have a gate electrically connected to the control circuit 6.

The transformer 23D includes a primary winding wire 231 and a secondary winding wire 232. The primary winding wire 231 has one end electrically connected to a connection point between the switching elements Q21 and Q22 of the first converter unit 21D. The primary winding wire 231 has the other end electrically connected to a connection point between the switching elements Q23 and Q24. The secondary winding wire 232 has one end electrically connected to a connection point between the switching elements Q25 and Q26 of the second converter unit 22D. The secondary winding wire 232 has the other end electrically connected to a connection point between the switching elements Q27 and Q28.

Also in the present variation, causing the converter circuit 2D and the prevention circuit 7 to operate in accordance with the above-described operation sequence enables the inrush current to the first capacitor C10 and the second capacitors C1 and C2 to be reduced.

(4.8) Eighth Variation

Figure 7B:
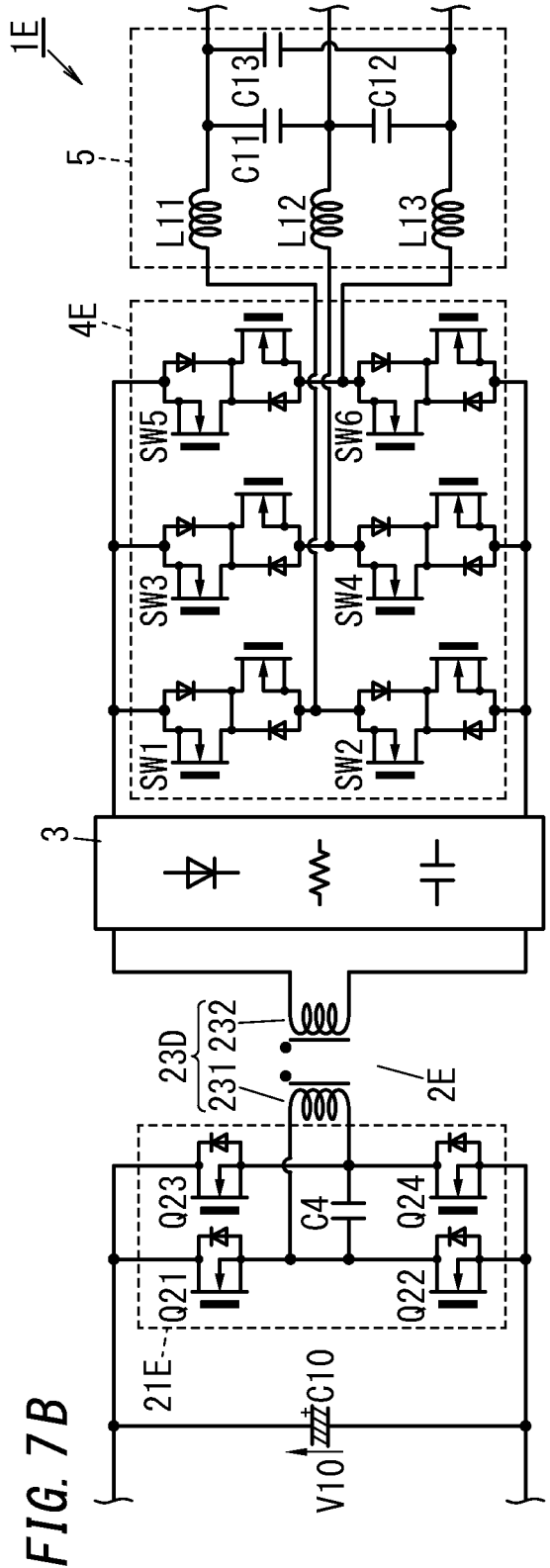
FIG. 7B is a circuit diagram illustrating a power conversion system according to an eighth variation of the embodiment of the present disclosure.

In the seventh variation, the inverter circuit 4 includes the six switching elements Q5 to Q10, but as illustrated in FIG. 7B, the inverter circuit 4 may include a plurality of (in FIG. 7B, six) bidirectional switches SW1 to SW6. In this case, as illustrated in FIG. 7B, a second converter unit may be omitted in a converter circuit 2E. A configuration of a power conversion system 1E according to an eighth variation will be described with reference to FIG. 7B. Note that components other than the converter circuit 2E and an inverter circuit 4E are similar to those in the above-described power conversion system 1D, are denoted by the same reference signs as those in the above-described power conversion system 1D, and the detailed description thereof is omitted. Moreover, in FIG. 7B, for simplification of the drawing, a control circuit 6, a prevention circuit 7, a pair of first connection terminals, and a plurality of second connection terminals are omitted.

The power conversion system 1E according to the eighth variation is, for example, a bidirectional DC/AC inverter. As illustrated in FIG. 7B, the power conversion system 1E includes a first capacitor C10, the converter circuit 2E, the control circuit 6 (see FIG. 1A), the prevention circuit 7 (see FIG. 1A), the pair of first connection terminals, and the plurality of second connection terminals. Moreover, the power conversion system 1E further includes a snubber circuit 3, the inverter circuit 4E, and a filter circuit 5.

As illustrated in FIG. 7B, the converter circuit 2E includes a first converter unit 21E and a transformer 23D. Note that the transformer 23D is similar to that in the seventh variation, and the detailed description is omitted herein.

The first converter unit 21E is a full-bridge converter circuit including four switching elements Q21 to Q24 in bridge connection. Each of the switching elements Q21 to Q24 is, for example, an n-channel depletion MOSFET. Between both ends of the first capacitor C10, the switching element Q21 is electrically connected in series to the switching element Q22. Between the both ends of the first capacitor C10, the switching element Q23 is electrically connected in series to the switching element Q24. That is, between the both ends of the first capacitor C10, a series circuit of the switching elements Q21 and Q22 and a series circuit of the switching elements Q23 and Q24 are electrically connected in parallel to each other. Moreover, a capacitor C4 is electrically connected between a connection point of the switching element Q21 to the switching element Q22 and a connection point of the switching element Q23 to the switching element Q24.

The switching elements Q21 and Q23 each have a drain electrically connected to one end (positive-electrode-side end) of the first capacitor C10. The switching elements Q22 and Q24 each have a source electrically connected to the other end (negative-electrode-side end) of the first capacitor C10. The switching element Q21 has a source electrically connected to the drain of the switching element Q22. The switching element Q23 has a source electrically connected to the drain of the switching element Q24. The switching elements Q21 to Q24 each have a gate electrically connected to the control circuit 6.

The inverter circuit 4E is a full-bridge inverter circuit including a plurality of (in FIG. 7B, six) bidirectional switches SW1 to SW6 in bridge connection. Each of the bidirectional switches SW1 to SW6 includes, for example, two MOSFETs connected in anti-parallel to each other.

Between a pair of third connection terminals, the bidirectional switch SW1 is electrically connected in series to the bidirectional switch SW2. Between the pair of third connection terminals, the bidirectional switch SW3 is electrically connected in series to the bidirectional switch SW4. Between the pair of third connection terminals, the bidirectional switch SW5 is electrically connected in series to the bidirectional switch SW6. That is, between the pair of third connection terminals, a series circuit of the bidirectional switches SW1 and SW2, a series circuit of the bidirectional switches SW3 and SW4, and a series circuit of the bidirectional switches SW5 and SW6 are electrically connected in parallel to each other.

A connection point between the bidirectional switches SW1 and SW2 is electrically connected to one end of an inductor L11 of a filter circuit 5. A connection point between the bidirectional switches SW3 and SW4 is electrically connected to one end of an inductor L12. A connection point between the bidirectional switches SW5 and SW6 is electrically connected to one end of an inductor L13.

Also in the present variation, causing the converter circuit 2E and the prevention circuit 7 to operate in accordance with the above-described operation sequence enables the inrush current to the first capacitor C10 and the second capacitors C1 and C2 to be reduced.

(4.9) Other Variations

Other variations will be described below.

In the above-described embodiment, an example in which a connection target of the plurality of second connection terminals T21, T22, and T23 is the alternating-current grid 91 has been described, but the connection target is not limited to the alternating-current grid 91. The connection target may be, for example, as illustrated in FIG. 1B or 1C, the alternating-current load 92 or the direct-current load 93.

In the above-described embodiment, an example in which the direct-current power supply 8 is a storage battery has been described. However, the direct-current power supply 8 is not limited to the storage battery but may include, for example, a storage battery and a DC/DC converter.

In the above-described embodiment, the prevention circuit 7 includes: the first openable/closable unit 71 and the second openable/closable unit 72 connected in parallel to each other; and the register R1 connected in series to the second openable/closable unit 72. However, the prevention circuit 7 is not limited to the above-described configuration. That is, the prevention circuit 7 may have any other configuration as long as it is switchable at least between the high-impedance state and the low-impedance state.

In the above-described embodiment, an example in which the second openable/closable units 72 is a solid-state relay has been described, but the second openable/closable unit 72 is not limited to the solid-state relay but may be a mechanical relay. Moreover, the first openable/closable unit 71 is also not limited to the mechanical relay but may be a solid-state relay.

In the above-described embodiment, the converter circuit 2 is stopped before the drive frequency of the converter circuit 2 is switched from the first frequency f1 to the second frequency f2. However, the duty cycle of the converter circuit 2 may be reduced. Similarly, this configuration enables the influence of iron loss of the transformer 23 to be reduced.

In the above embodiment, when a specified time has elapsed since the converter circuit 2 was started to operate, the prevention circuit 7 is switched to the low-impedance state. In contrast, for example, when at least one of the voltage V10 across the first capacitor C10 and the voltages V1 and V2 respectively across the second capacitors C1 and C2 has reached a specified voltage Vo since the converter circuit 2 was started to operate, the prevention circuit 7 may be switched to the low-impedance state. Similarly, this configuration enables the inrush current to the first capacitor C10 and the second capacitors C1 and C2 to be reduced. In this case, the voltage V1 (or voltage V2) across the second capacitor C1 (or second capacitor C2) may be detected, or the voltage V10 across the first capacitor C10 may be detected.

In the above-described embodiment, the operation of the converter circuit 2 is started at a switching timing at which the prevention circuit 7 is switched from the off-state to the high-impedance state. In contrast, the operation of the converter circuit 2 may be started before the switching timing at which the prevention circuit 7 is switched from the off-state to the high-impedance state. Similarly, this configuration enables the inrush current to the second capacitors C1 and C2 to be reduced.

The time period T3 in FIG. 3 is a stand-by time until the first openable/closable unit 71 is turned ON, but the time period T3 may be 0.

In the above-described embodiment, an example in which each of the switching elements Q1 to Q10 is a MOSFET has been described, but each of the switching elements Q1 to Q10 is not limited to the MOSFET but may include, for example, a bipolar transistor and a freewheeling diode.

In the above-described embodiment, the converter circuit 2 is stopped before the drive frequency of the converter circuit 2 is switched from the first frequency f1 to the second frequency f2, but the converter circuit 2 does not have to be stopped as long as the first frequency f1 is higher than the second frequency f2.

In the sixth variation, an example in which the power conversion system 1C is a step-up converter circuit has been described, but the power conversion system 1C is not limited to the step-up converter circuit but may be a step-down converter circuit.

In the above-described embodiment, the drive signal Sig1 of the second openable/closable unit 72 and the drive signal Sig3 of the converter circuit 2 are output at the same timing, but the drive signal Sig3 of the converter circuit 2 may be output, for example, after the drive signal Sig1 of the second openable/closable unit 72 is output. In other words, the operation of the converter circuit 2 is started at least before a transition period of the voltage V10 across the first capacitor C10 ends.

(Summary)

As described above, a power conversion system (1, 1A to 1E) of a first aspect is configured to unidirectionally or bidirectionally transfer electric power between a direct-current power supply (8) and any one of an alternating-current grid (91), an alternating-current load (92), or a direct-current load (93). The power conversion system (1, 1A to 1E) includes a first capacitor (C10), a converter circuit (2, 2C to 2E) which is an isolated type converter circuit, and a control circuit (6). The first capacitor (C10) is connected to the direct-current power supply (8) via an inrush current prevention circuit (7). The inrush current prevention circuit (7) is switchable at least between a high-impedance state where impedance is relatively high and a low-impedance state where the impedance is relatively low. The converter circuit (2, 2C to 2E) includes a transformer (23, 23D) having a primary winding wire (231) and a secondary winding wire (232), and the first capacitor (C10) is connected to the primary winding wire (231). The control circuit (6) is configured to control the inrush current prevention circuit (7) and the converter circuit (2, 2C to 2E). The control circuit (6) is configured to cause the converter circuit (2, 2C to 2E) to start operating and then switch the inrush current prevention circuit (7) from the high-impedance state to the low-impedance state.

As described above, with this configuration, since the converter circuit (2, 2C to 2E) is caused to operate with the inrush current prevention circuit (7) being in the high-impedance state, it is possible to reduce the inrush current to at least the first capacitor (C10).

In a power conversion system (1, 1A to 1E) of a second aspect referring to the first aspect, the inrush current prevention circuit (7) includes a first openable/closable unit (71) and a second openable/closable unit (72). The first openable/closable unit (71) has one end connected to the direct-current power supply (8) and the other end connected to the first capacitor (C10). The first openable/closable unit (71) is configured to bring the inrush current prevention circuit (7) into the low-impedance state by making an electrical path between the direct-current power supply (8) and the first capacitor (C10). Between the direct-current power supply (8) and the first capacitor (C10), the second openable/closable unit (72) is connected in parallel to the first openable/closable unit (71). The second openable/closable unit (72) is configured to bring the inrush current prevention circuit (7) into the high-impedance state by making an electrical path between the direct-current power supply (8) and the first capacitor (C10).

With this aspect, simply switching between the first openable/closable unit (71) and the second openable/closable unit (72) enables the inrush current prevention circuit (7) to be switched between the high-impedance state and the low-impedance state.

In a power conversion system (1, 1A to 1E) of a third aspect referring to the first or second aspect, the control circuit (6) is configured to cause the converter circuit (2) to operate when the inrush current prevention circuit (7) is in the high-impedance state.

With this aspect, when the inrush current prevention circuit (7) is in the high-impedance state, the converter circuit (2) is caused to operate, and therefore, it is possible to reduce the inrush current to a capacitor (a second capacitor (C1, C2, C3)) provided on a secondary side of the converter circuit (2).

In a power conversion system (1, 1A to 1E) of a fourth aspect referring to any one of the first to third aspects, a first frequency (f1) is higher than a second frequency (f2). The first frequency (f1) is a drive frequency of the converter circuit (2, 2C to 2E) when the inrush current prevention circuit (7) is in the high-impedance state. The second frequency (f2) is a drive frequency of the converter circuit (2, 2C to 2E) at a steady state.

In this aspect, it is possible to reduce iron loss of the transformer (23, 23D) more than in a case where the first frequency (f1) is lower than or equal to the second frequency (f2).

In a power conversion system (1, 1A to 1E) of a fifth aspect referring to the fourth aspect, the control circuit (6) is configured to stop the converter circuit (2, 2C to 2E) before switching the drive frequency of the converter circuit (2, 2C to 2E) from the first frequency (f1) to the second frequency (f2). Alternatively, the control circuit (6) is configured to reduce a duty cycle of the converter circuit (2, 2C to 2E) before switching the drive frequency of the converter circuit (2, 2C to 2E) from the first frequency (f1) to the second frequency (f2).

With this aspect, stopping the converter circuit (2, 2C to 2E) or reducing the duty cycle of the converter circuit (2, 2C to 2E) enables the iron loss of the transformer (23, 23D) to be reduced.

A power conversion system (1, 1A to 1E) of a sixth aspect referring to any one of the first to fifth aspects further comprising a snubber circuit (3, 3A) connected to the secondary winding wire (232).

With this aspect, it is possible to reduce a high voltage generated when the converter circuit (2, 2C to 2E) is turned off.

In a power conversion system (1, 1A to 1E) of a seventh aspect referring to the sixth aspect, the snubber circuit (3, 3A) includes a second capacitor (C1, C2, C3) which is different from the first capacitor (C10) serving as the capacitor and which is connected to the secondary winding wire (232). The control circuit (6) is configured to switch the inrush current prevention circuit (7) to the low-impedance state when at least one of voltages (V10, V1, V2) respectively across the first capacitor (C10) and the second capacitor (C1, C2) has reached a specified voltage (Vo) since the operation of the converter circuit (2, 2C to 2E) was started. Alternatively, the control circuit (6) is configured to switch the inrush current prevention circuit (7) to the low-impedance state at a lapse of a specified time since starting of the operation of the converter circuit (2, 2C to 2E).

With this aspect, the inrush current prevention circuit (7) is brought into the low-impedance state in a state where the first capacitor (C10) and the second capacitor (C1, C2, C3) are charged to a certain extent. In this case, it is possible to reduce an inrush current to the first capacitor (C10) and the second capacitors (C1, C2, C3) more than in a case where the inrush current prevention circuit (7) is brought into the low-impedance state in a state where the first capacitor (C10) and the second capacitors (C1, C2, C3) are in an uncharged state.

In a power conversion system (1, 1A to 1E) of an eighth aspect referring to any one of the first to seventh aspects, the inrush current prevention circuit (7) is configured to be switchable among the high-impedance state, the low-impedance state, and an off-state. The off-state is a state where the direct-current power supply (8) and the first capacitor (C10) are electrically disconnected from each other. The control circuit (6) is configured to cause the converter circuit (2, 2C to 2E) to start operating at a switching timing at which the inrush current prevention circuit (7) is switched from the off-state to the high-impedance state or before the switching timing.

With this aspect, at the switching timing or before the switching timing, the converter circuit (2, 2C to 2E) is caused to start operating. In this case, the inrush current to the second capacitors (C1 and C2) is reduced more than in a case where the operation of the converter circuit (2, 2C to 2E) is started after the switching timing.

A power conversion system (1, 1A to 1E) of a ninth aspect referring to any one of the first to eighth aspects further includes an inrush current prevention circuit (7).

With this aspect, it is possible to reduce the inrush current to the first capacitor (C10) more than in a case where the inrush current prevention circuit (7) is not included.

The configurations of the second to ninth aspects are not configurations essential for the power conversion system (1, 1A to 1E) and may accordingly be omitted.

REFERENCE SIGNS LIST 1, 1A to 1E POWER CONVERSION SYSTEM
2, 2C to 2E CONVERTER CIRCUIT
12 TRANSFORMER
231 PRIMARY WINDING WIRE
232 SECONDARY WINDING WIRE
3, 3A SNUBBER CIRCUIT
6 CONTROL CIRCUIT
7 INRUSH CURRENT PREVENTION CIRCUIT
71 FIRST OPENABLE/CLOSABLE UNIT
72 SECOND OPENABLE/CLOSABLE UNIT
8 DIRECT-CURRENT POWER SUPPLY
91 ALTERNATING-CURRENT GRID
92 ALTERNATING-CURRENT LOAD
93 DIRECT-CURRENT LOAD
C10 FIRST CAPACITOR (CAPACITOR)
C1, C2, C3 SECOND CAPACITOR
f1 FIRST FREQUENCY
f2 SECOND FREQUENCY
V1, V2, V10 BOTH ENDS VOLTAGE
Vo SPECIFIED VOLTAGE

The invention claimed is:

1. A power conversion system configured to unidirectionally or bidirectionally transfer electric power between a direct-current power supply and any one of an alternating-current grid, an alternating-current load, or a direct-current load, the power conversion system comprising:
a capacitor connected to the direct-current power supply via an inrush current prevention circuit which is switchable at least between a high-impedance state where impedance is relatively high and a low-impedance state where the impedance is relatively low; and
a converter circuit which is an isolated type converter circuit, the converter circuit including a transformer, the transformer having a primary winding wire and a secondary winding wire, the capacitor being connected to the primary winding wire;
a control circuit configured to control the inrush current prevention circuit and the converter circuit,
the control circuit being configured to cause the converter circuit to start operating and then switch the inrush current prevention circuit from the high-impedance state to the low-impedance state.

2. The power conversion system of claim 1, wherein
the inrush current prevention circuit includes
a first openable/closable unit having one end connected to the direct-current power supply and the other end connected to the capacitor, the first openable/closable unit being configured to bring the inrush current prevention circuit into the low-impedance state by making an electrical path between the direct-current power supply and the capacitor, and
a second openable/closable unit which is, between the direct-current power supply and the capacitor, connected in parallel to the first openable/closable unit, the second openable/closable unit being configured to bring the inrush current prevention circuit into the high-impedance state by making an electrical path between the direct-current power supply and the capacitor.

3. The power conversion system of claim 1, wherein
the control circuit is configured to cause the converter circuit to operate when the inrush current prevention circuit is in the high-impedance state.

4. The power conversion system of claim 1, wherein
the converter circuit has a first frequency which is a drive frequency when the inrush current prevention circuit is in the high-impedance state, the first frequency being higher than a second frequency which is a drive frequency of the converter circuit at a steady state.

5. The power conversion system of claim 4, wherein
the control circuit is configured to stop the converter circuit or reduce a duty cycle of the converter circuit before the drive frequency of the converter circuit is switched from the first frequency to the second frequency.

6. The power conversion system of claim 1, further comprising a snubber circuit connected to the secondary winding wire.

7. The power conversion system of claim 6, wherein
the snubber circuit includes a second capacitor which is different from a first capacitor serving as the capacitor and which is connected to the secondary winding wire,
the control circuit is configured to switch the inrush current prevention circuit to the low-impedance state when at least one of a voltage across the first capacitor or a voltage across the second capacitor has reached a specified voltage since operation of the converter circuit was started or at a lapse of a specified time since starting of the operation of the converter circuit.

8. The power conversion system of claim 1, wherein
the inrush current prevention circuit is switchable among the high-impedance state, the low-impedance state, and an off-state where the direct-current power supply and the capacitor are electrically disconnected from each other, and
the control circuit is configured to cause the converter circuit to start operating at a switching timing at which the inrush current prevention circuit is switched from the off-state to the high-impedance state or before the switching timing.

9. The power conversion system of claim 1, further comprising the inrush current prevention circuit.

* * * * *